Inventor:
John J. Gaughan.
by Charles L. Gooding, Atty.

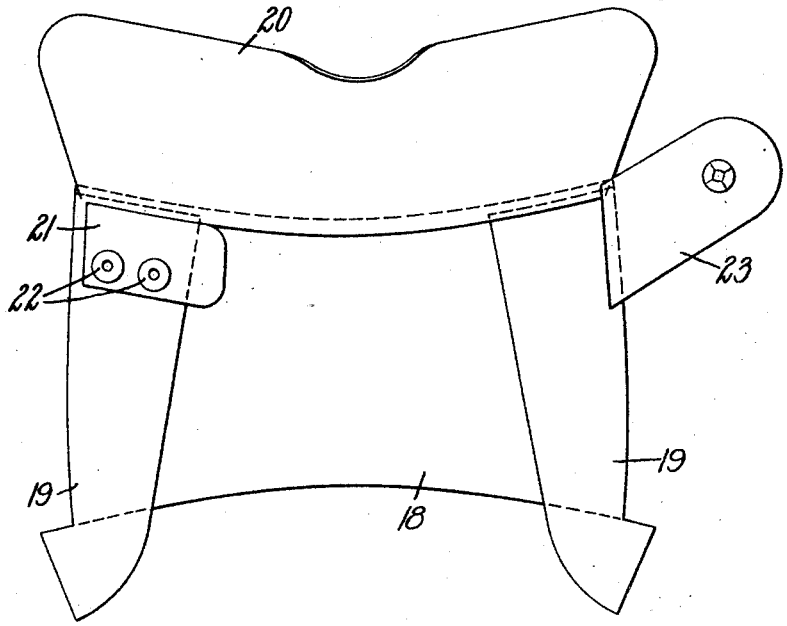
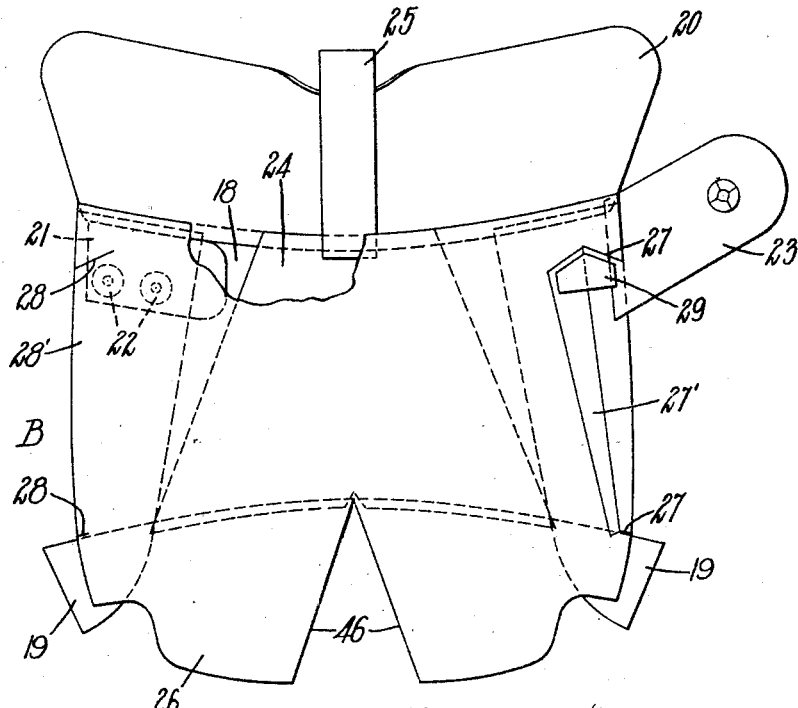

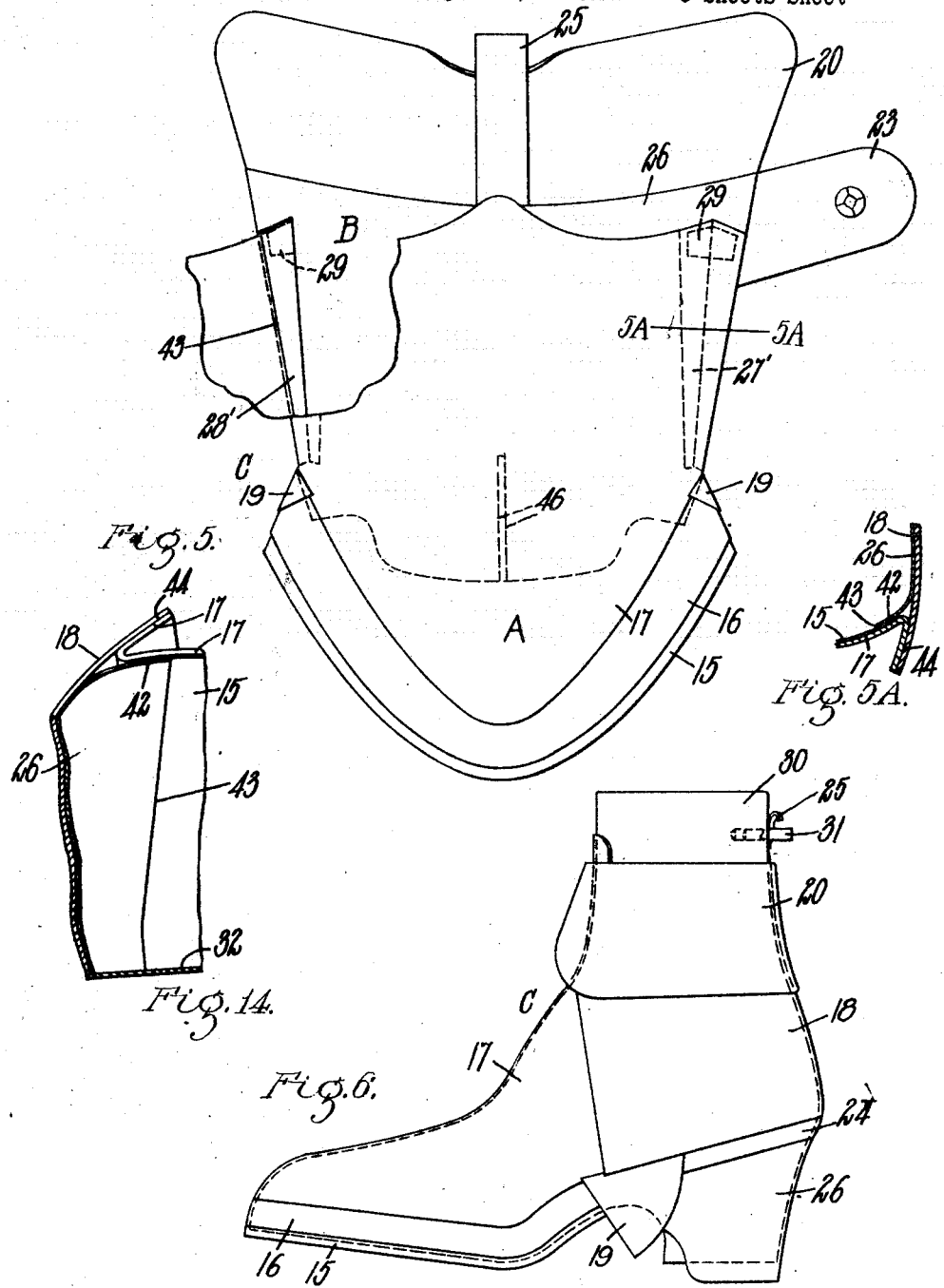

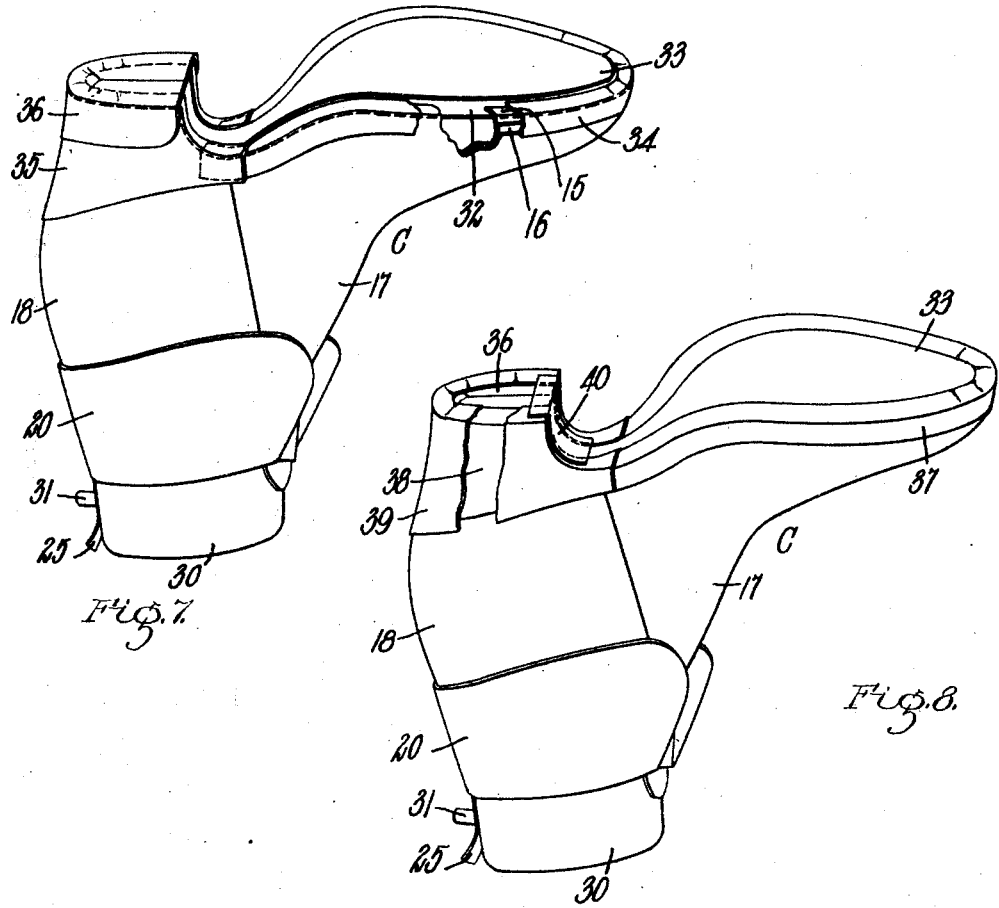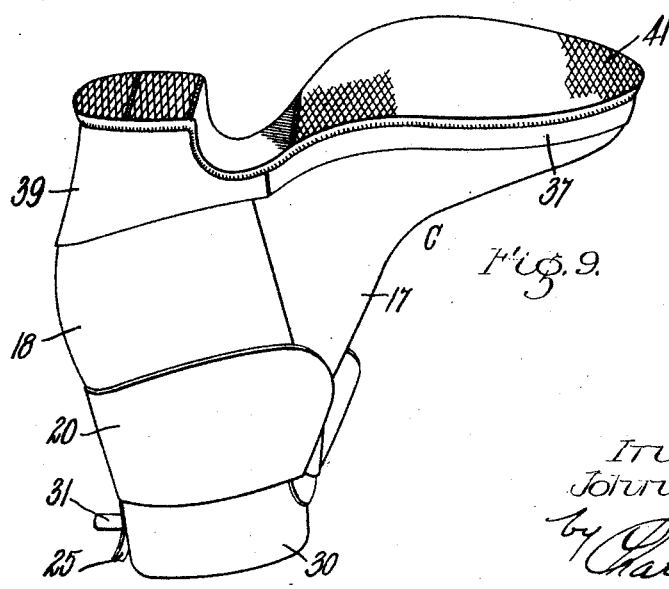

Patented Feb. 19, 1929.

1,702,864

UNITED STATES PATENT OFFICE.

JOHN J. GAUGHAN, OF ARLINGTON, MASSACHUSETTS, ASSIGNOR TO HOOD RUBBER COMPANY, OF WATERTOWN, MASSACHUSETTS, A CORPORATION OF MASSACHUSETTS.

OVERSHOE AND METHOD OF MANUFACTURE.

Application filed April 2, 1928. Serial No. 266,590.

This invention relates to an improved overshoe and to the method of manufacturing the same.

In the old method of constructing overshoes, the overshoe was built piece by piece upon a last and then removed from the last by cutting the lining on each side at the place where the vamp folds back under the quarter. The shoe is then opened and pulled from the last with considerable difficulty. The edges of the lining are next trimmed back to the edges of the pockets and the shoe is finished.

In the present construction, the vamp is made up complete and the quarter is also made in the same manner on a flat table. The two are then joined together along the opposite sides of the upper, the result being a complete upper and a lining which is continuous except for a joining line on opposite sides of the inside of the shoe where the edges of the vamp lining are joined to the edges of the quarter lining.

After the upper has been thus constructed, it is placed on a last and the edge is folded over and stuck to an insole which is also placed upon the last with a filler superimposed thereon, then the foxing, sole reinforcements and outsole are applied and the shoe is vulcanized. The shoe when thus completed is very smooth and neat appearing on the inside, there being only two lines as hereinbefore stated on opposite sides of the shoe on the inside.

By making the shoe as hereinbefore described, comparatively inexperienced help can be employed as it is a very easy matter to make the vamp and the quarter separate on a flat table and then join them together, as compared with the old method in which all these parts were built up on the last.

To these ends the invention consists in an improved overshoe and in the method of manufacturing the shoe, which broadly stated consists in making up the vamp on a support, such as a flat table, and in making up the quarter on a support, such as a flat table, then joining the vamp and quarter together on opposite sides and then lasting the same to the insole.

The invention further consists in the combination and arrangement of parts set forth in the following specification and particularly pointed out in the claims, and in the method whereby those parts are assembled to form the overshoe, or the upper of an overshoe, or the vamp, or the quarter of the improved overshoe.

Referring to the drawings.

Figure 1:
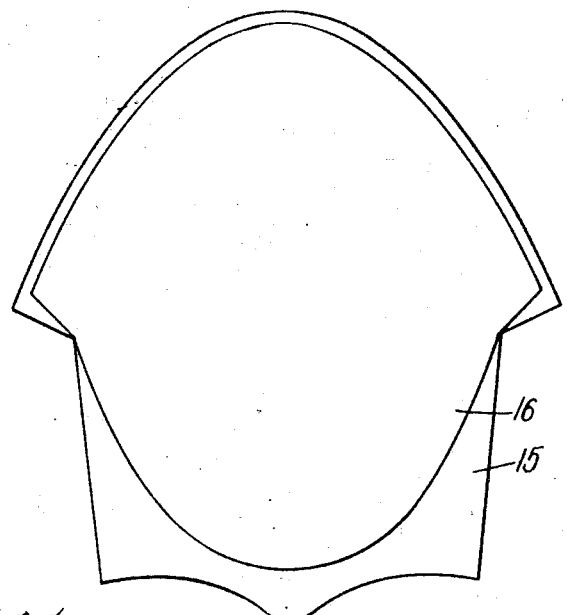
Figure 1 is a plan view of a vamp lining 15 with the inner face down and the coated side up and a gum inner vamp 16 superimposed thereon, the gum inner vamp consisting of elastic gum compound.

Figs. 3 and 4 illustrate the construction of a quarter B. Fig. 3 shows the outer layer 18 of the quarter with side stays 19 positioned thereon and adhesively attached thereto and the cuff 20 attached to the upper edges of the outer layer of the quarter and of the side stays, a stud stay 21 being shown attached to one side of the quarter and side stay 19 by studs 22, a tab 23 being shown attached to the other side of the outer layer 18 and to the side stay 19.

Fig. 4 shows the parts illustrated in Fig. 3 and in addition thereto the gum back stay 24 placed upon the outer layer 18 and the lasting up strip 25 attached to the upper edge of the gum back stay 24. Superimposed upon the gum back stay and extending over the side stays 19 is the quarter lining 26, the quarter lining being slitted on its opposite sides at 27 and 28 to form flaps 27' and 28', the flap 27' being shown folded back. Quarter lining stays 29 are attached to the folded back flaps 27' and 28' and to the side stays 19.

Fig. 5 is a plan view of the quarter B and vamp A joined together to form a complete upper C the upper being opened out.

Fig. 5^A is a detail section taken on line 5^A—5^A, Fig. 5.

Fig. 6 illustrates the upper C shown in Fig. 5 placed upon the last and the cuff portion turned down with the lasting up strip fastened by a pin 31 to a last 30.

Fig. 7 shows a perspective view, partly broken away for clearness of illustration, of the upper illustrated in Fig. 6 on the last, the upper being pulled over and fastened to an insole 32 which has been placed upon the last, together with a filler 33 which was previously applied to the insole, and a friction lasting strip 34 applied to the upper and insole, also a junior 35 and heel stay 36 applied to the heel portion of the upper and folded over upon the heel portion of the insole.

Fig. 8 is a perspective view, partly broken away for clearness of illustration, of the parts illustrated in Fig. 7 and in addition thereto showing a toe foxing 37 applied to the upper and insole from the central portion of the arch around the toe; also a friction heel piece 38 and heel foxing 39 applied over the junior 35 and heel stay 36 and folded over onto the heel portion; also a shank stay 40 applied to the breast of the heel.

Fig. 9 is a perspective view of the completed shoe, being the same as the shoe illustrated in Fig. 8 with an outsole 41 attached thereto.

Figure 10:
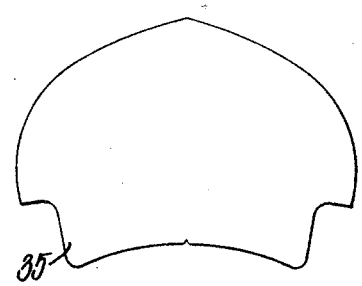

Fig. 10 is a plan view of the junior 35.

Figure 11:
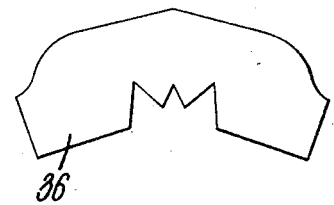

Fig. 11 is a plan view of the heel stay 36.

Figure 12:
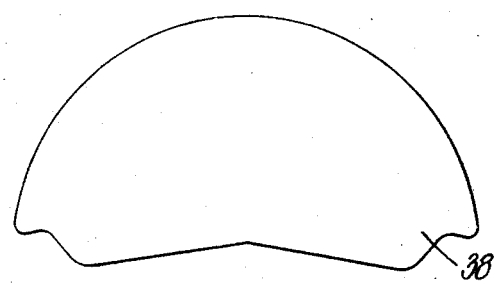

Fig. 12 is a plan view of the friction heel piece 38.

Figure 13:
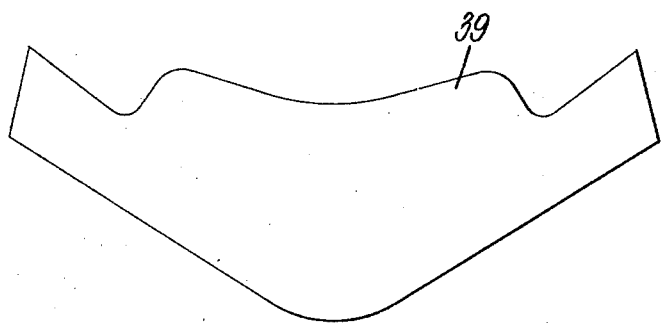

Fig. 13 is a plan view of the heel foxing 39.

Fig. 14 is a detail view of a portion of the inside of the upper with the upper opened out and illustrating the line of union 43 extending from the top of the vamp to the upper face of the insole 32.

Like numerals refer to like parts throughout the several views of the drawings.

Figure 2:
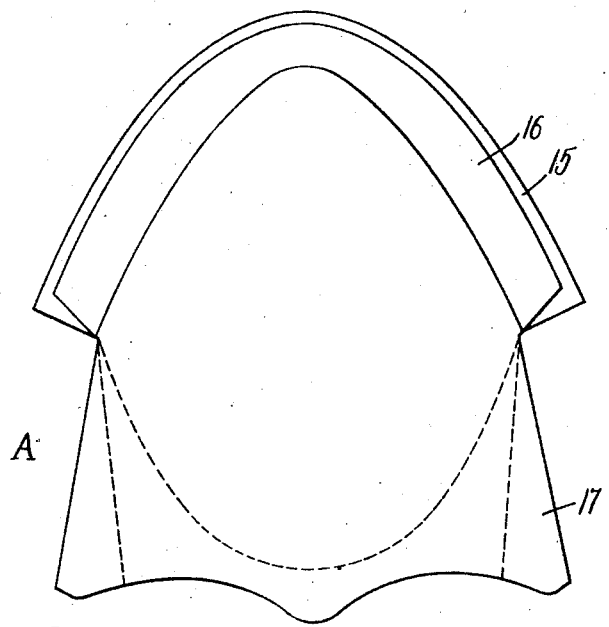
Fig. 2 is a plan view of the vamp A complete embodying the parts as illustrated in Fig. 1 with an outer vamp layer 17 superimposed thereon and attached thereto by the adhesive quality of the gum inner vamp 16 and also by the adhesive material on the inner face of the outer vamp layer.

In the drawings, Fig. 1 illustrates the first step in the operation of forming the vamp. The vamp lining consists preferably of a knitted material, known as stockinet, and has one of its surfaces gummed, and this gummed surface is placed uppermost when the vamp is being constructed. The vamp lining 15 is laid upon a bench, or table, and then a gum inner vamp 16 is laid thereon in the relative position illustrated in Fig. 1, the gum inner vamp being composed of an elastic gum material. The next step in the method of constructing the vamp is illustrated in Fig. 2, wherein the outer layer 17 of the vamp is laid upon the parts illustrated in Fig. 1 and pressed downwardly thereagainst. The outer layer 17 preferably consists of a fabric of any desired color or appearance with a gummed inner face.

Fig. 2, therefore, illustrates the completed vamp A which consists of the lining 15, the gum inner vamp 16 and the outer layer of material 17 for the vamp A. The quarter B is illustrated in Fig. 4 and this quarter is constructed by laying the outer layer 18 of the quarter upon a table or other flat surface, said outer layer consisting of a piece of fabric with a gummed inner surface. To this piece of fabric is attached the side stays 19 which are preferably composed of a woven fabric. A stud stay 21 is fastened by two studs 22 to one of the side stays 19 and to the outer layer 18 of the quarter.

On the opposite side therefrom a tab 23 is affixed to one of the side stays 19. The cuff, which consists of a piece of material presenting a fabric surface on both of its faces is attached to the upper edge of the outer layer 18 and to the upper edges of the side stays 19.

The next step in the method of manufacture of the quarter is shown in Fig. 4 where the quarter B is completed by attaching a gum back stay 24 to the inner face of the outer layer 18 of the quarter and a lasting up strip 25 is attached to the upper edge of the gum back stay 24. Superimposed upon the gum back stay and extending over the side stays 19 is a quarter lining 26, the quarter lining being slitted on its opposite sides at 27 and 28 to form flaps 27' and 28', and bifurcated at 46.

In Fig. 4 the flap 27' is shown as folded back and in the method of manufacture the flap 28' is folded back in the same manner as the flap 27'. Quarter lining stays 29 are attached to the flaps 27' and 28' when they have been folded back, and these quarter lining stays are also attached to the side stays 19. The quarter B shown in Fig. 4 is thus completed.

The next step in the method of manufacture is to join the vamp illustrated in Fig. 2 to the quarter illustrated in Fig. 4. This is done as shown in Fig. 5. The opposite sides of the vamp are attached to the opposite sides of the quarter, the outer layer of the quarter 18 overlapping and having its reverse face fastened to the reverse face of the outer layer 17 of the vamp along the line 44 as illustrated in Fig. 5ᴬ and Fig. 14, and the lining 26 of the quarter overlapping and having its reverse face fastened to the obverse face of the vamp lining 15 along the line 42, Fig. 5ᴬ and Fig. 14. It will thus be seen that on the inner face of the upper there are only two lines showing where the fabric joins it on opposite sides, namely lines corresponding to the line 43, Fig. 14, the inner surface of the shoe thus presenting a smooth and unbroken surface except for the two lines 43.

In Fig. 5 the complete upper is shown with the vamp attached thereto being broken away and a portion of the vamp turned back in order to illustrate more clearly the construction of the same and the manner in which it is attached to the quarter, the edges of the bifurcated portion 46 (being lapped one over the other) overlapping. The upper C now having been completed as illustrated in Fig. 5, it is placed upon a last 30 and the cuff portion 20 is turned down, all as illustrated in Fig. 6, the lasting up strip 25 being shown as fastened to the last by a pin 31.

It will be seen in Fig. 6 that the vamp lining 15 projects below the gum inner vamp 16 and the gum inner vamp projects below the vamp outer layer 17, and also that the quarter lining 26 projects below the gum back stay 24, and the gum back stay projects below the outer layer of the quarter 18, and the side stays 19 project downwardly adjacent to the breast of the heel on opposite sides of the shoe.

The next step in the method is illustrated in Fig. 7 which shows the upper C pulled over and attached to an insole 32 which has a filler 33 superimposed thereon. A friction lasting strip 34 is shown in this figure applied to the upper and to the insole, also a junior 35 and a heel stay 36 are applied to the heel portion of the upper and folded over upon the heel portion of the insole.

Another step in the process is illustrated in Fig. 8 wherein a toe foxing 37 is shown as having been applied to the upper and insole and extending from the central portion of the arch around the toe. Also a friction heel piece 38 is shown as applied over the heel stay 36 and junior 35 and folded over onto the heel portion of the insole. Also a heel foxing 39 is shown applied over the heel piece 38 and a shank stay 40 is shown in this view as applied to the breast of the heel.

Fig. 9 illustrates the completed shoe the same consisting of the parts illustrated in Fig. 8 with an outsole 41 attached thereto.

The shoe on the last is then vulcanized in a vulcanizing oven and then removed from the oven. The pin 31 is then pulled out of the last and the shoe slipped from the last as easily as though slipping the same off of the foot, and the lasting-up strip cut off at the top of the cuff, thus completing the shoe.

I claim:

1. An overshoe embodying therein an upper having, in combination, a vamp comprising an outer layer and a lining therefor, and a quarter comprising an outer layer and a lining therefor, the said vamp and quarter being joined together on opposite sides of said upper, the outer layer of the quarter overlapping and having its reverse face fastened to the reverse face of the outer layer of the vamp on opposite sides thereof, and the lining of the quarter overlapping and having its reverse face fastened to the obverse face of said vamp lining on opposite sides thereof, whereby a single line of union between the said linings is visible on the inside of the overshoe on opposite sides thereof respectively.

2. An overshoe embodying therein an upper having, in combination, a vamp comprising an outer layer and a lining therefor, and a quarter comprising an outer layer and a lining therefor, the lining of the quarter having a portion thereof on its opposite sides turned inwardly to form flaps, the outer layer of the quarter overlapping and having its reverse face fastened to the reverse face of the outer layer of the vamp on opposite sides thereof, said flaps overlapping and having their reverse faces fastened to the obverse face of the said vamp lining on opposite sides thereof, whereby a single line of union between the said linings is visible on the inside of the overshoe on opposite sides thereof respectively.

3. The method of constructing a quarter for an overshoe which consists in laying on a support an outer layer of a quarter, then superimposing thereon a cuff, a gum back stay, and side stays, and a lasting up strip and then superimposing thereon a lining.

4. The method of constructing an upper for an overshoe which consists in laying a lining of a vamp on a support, then superimposing on the lining a gum elastic intermediate layer and then superimposing on said intermediate layer a vamp outer layer, thus forming a vamp, then constructing a quarter for an overshoe by laying on a support an outer layer of a quarter, then superimposing thereon a cuff, a gum back stay and side stays and a lasting-up strip, then superimposing thereon a quarter lining, then attaching the reverse face of the outer layer of the quarter along its opposite sides to the reverse face of the outer layer of the vamp along its opposite sides and attaching the reverse face of the lining of the quarter along its opposite sides to the obverse face of the vamp lining on its opposite sides to form a single line of union between the said linings visible on the inside of the overshoe on opposite sides thereof respectively.

In testimony whereof I have hereunto set my hand.

JOHN J. GAUGHAN.